United States Patent
Büchi et al.

(10) Patent No.: US 6,276,045 B1
(45) Date of Patent: Aug. 21, 2001

(54) METHOD AND APPARATUS FOR MAKING STRUCTURED PACKING ELEMENT

(75) Inventors: Franz Büchi, Unterehrendingen; Ernst Vogt, Remigen; Peter Dubach, Oberrohrdorf; Timothy Griffin, Ennetbaden; Jonathan Lloyd, Dintheon; Bettina Paikert, Oberrohrdorf, all of (CH)

(73) Assignee: ABB Lummus Global, Inc., Bloomfield, NJ (US)

( * ) Notice: Subject to any disclaimer, the term of this patent is extended or adjusted under 35 U.S.C. 154(b) by 0 days.

(21) Appl. No.: 09/181,186

(22) Filed: Oct. 28, 1998

(51) Int. Cl.[7] .............................. B23P 17/00; B31B 1/25; B31F 1/00; B26F 1/24
(52) U.S. Cl. ............................ 29/527.2; 83/660; 493/61; 493/437; 493/440
(58) Field of Search .............................. 72/379.02, 325, 72/326; 29/527.2; 83/660; 493/59, 61, 63, 396, 73, 437, 440, 444, 464

(56) References Cited

U.S. PATENT DOCUMENTS

| | | | | |
|---|---|---|---|---|
| 235,821 | * | 12/1880 | Stannard | 493/396 |
| 758,672 | * | 5/1904 | Mayall | 493/396 |
| 1,288,132 | * | 12/1918 | Nagle | 493/59 |
| 2,123,842 | * | 7/1938 | Cox | 72/379.2 |
| 3,039,372 | * | 6/1962 | La Bombard | 493/61 |
| 3,477,317 | * | 11/1969 | Liander | 83/660 |
| 3,526,566 | * | 9/1970 | McIlvain, Jr. et al. | 493/396 |
| 4,669,191 | * | 6/1987 | Schramm | 83/660 |
| 5,089,202 | * | 2/1992 | Lippold | 264/145 |

* cited by examiner

Primary Examiner—P. W. Echols
(74) Attorney, Agent, or Firm—Carella Byrne Bain; Elliot M. Olstein; William Squire

(57) ABSTRACT

Upper and lower mirror image die plates are resiliently supported and have predetermined displacement values for forming vortex generators and foldline crease channels without compressive deformation in a porous sintered metal fiber sheet material. Cutters and ridges coupled to the upper and lower die plates form the respective vortex generators and channels. The sheet of so formed material is then placed in an apparatus for bending the sheet at the foldline channels to corrugate the sheet without deformation of the sheet material between the corrugation bends. Fingers align with and engage the channels. The fingers are on plates that are ramped closer together simultaneously while the fingers on two mirror image coplanar sets of plates displace toward each other as the sheet material is folded. Pins on a pair of rotating levers engage each of the finger plates of the two sets for relatively horizontally displacing the plates and corresponding fingers as they are ramped together vertically.

36 Claims, 15 Drawing Sheets

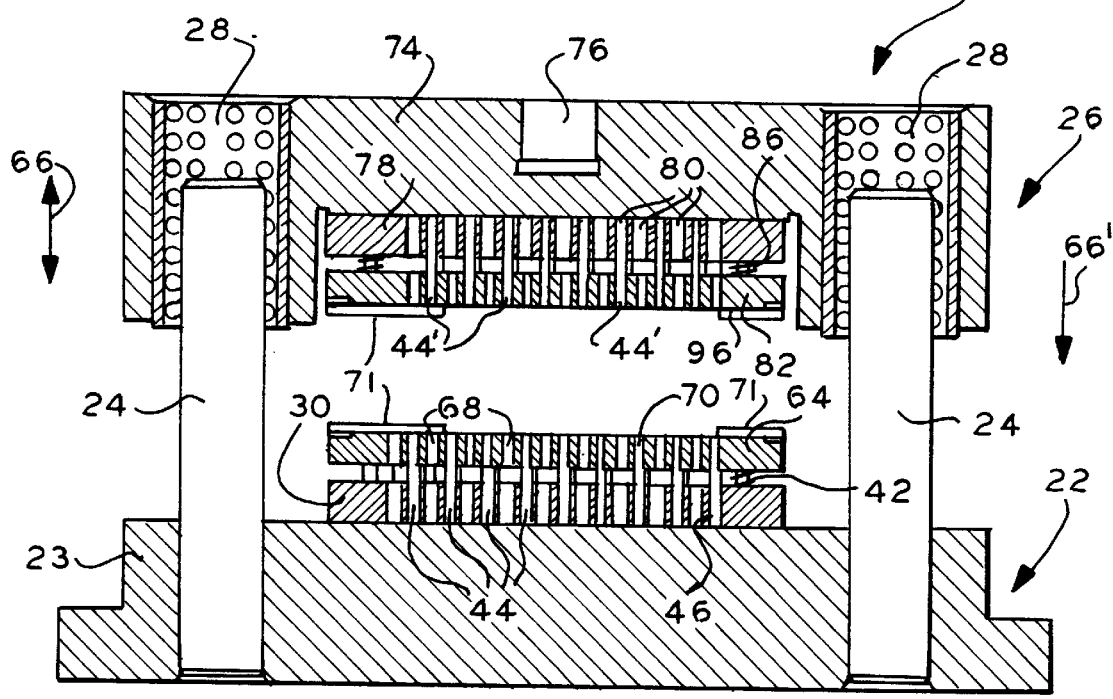
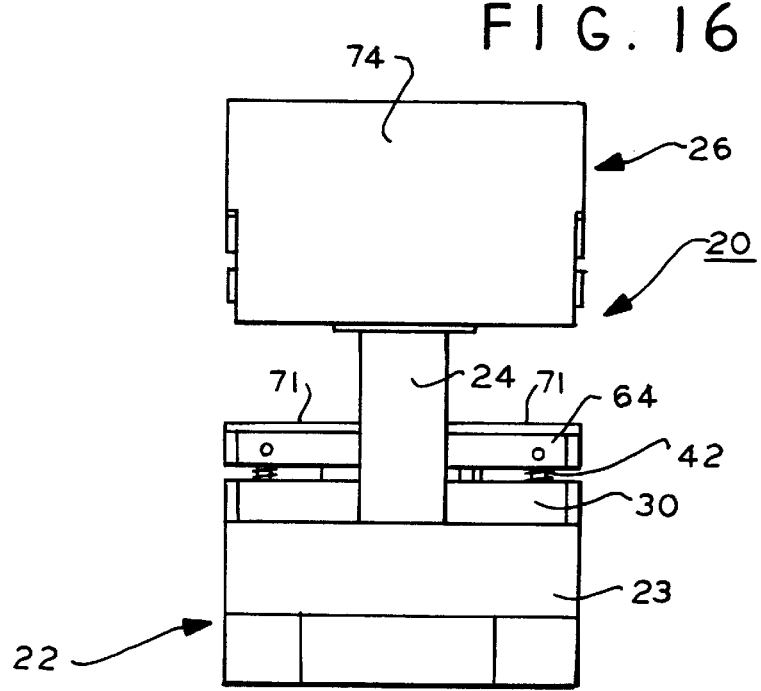

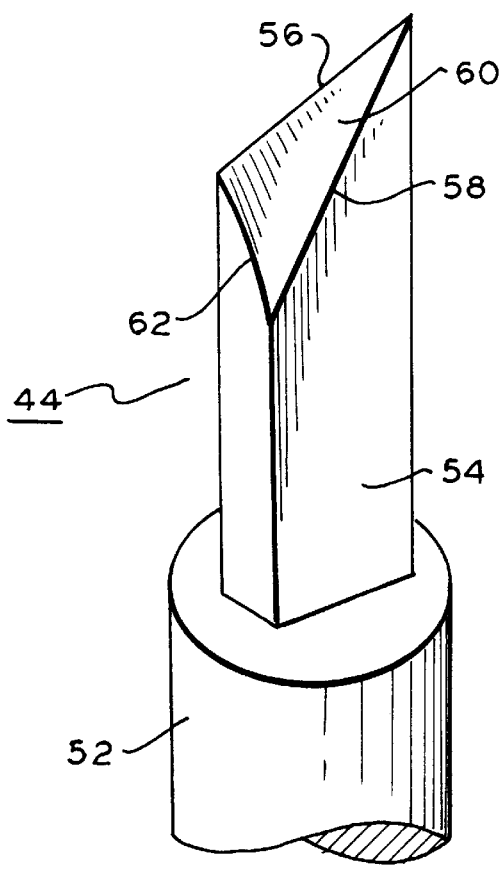
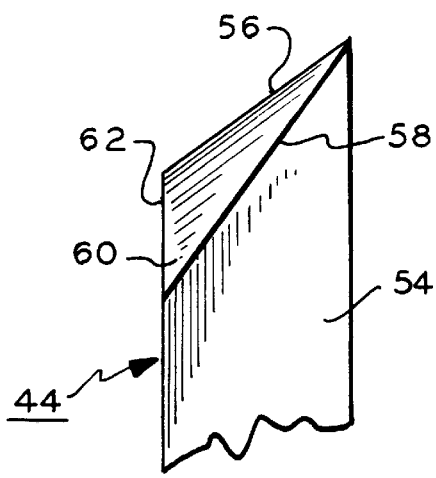
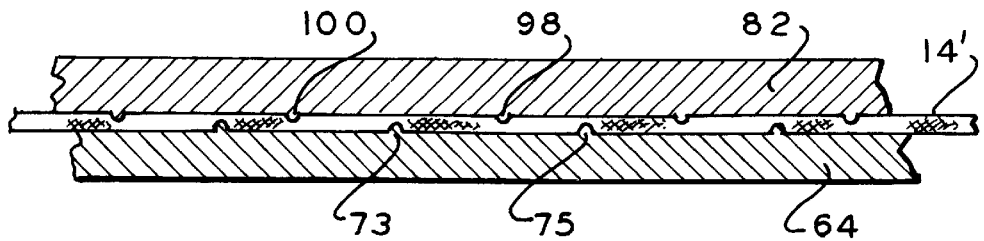

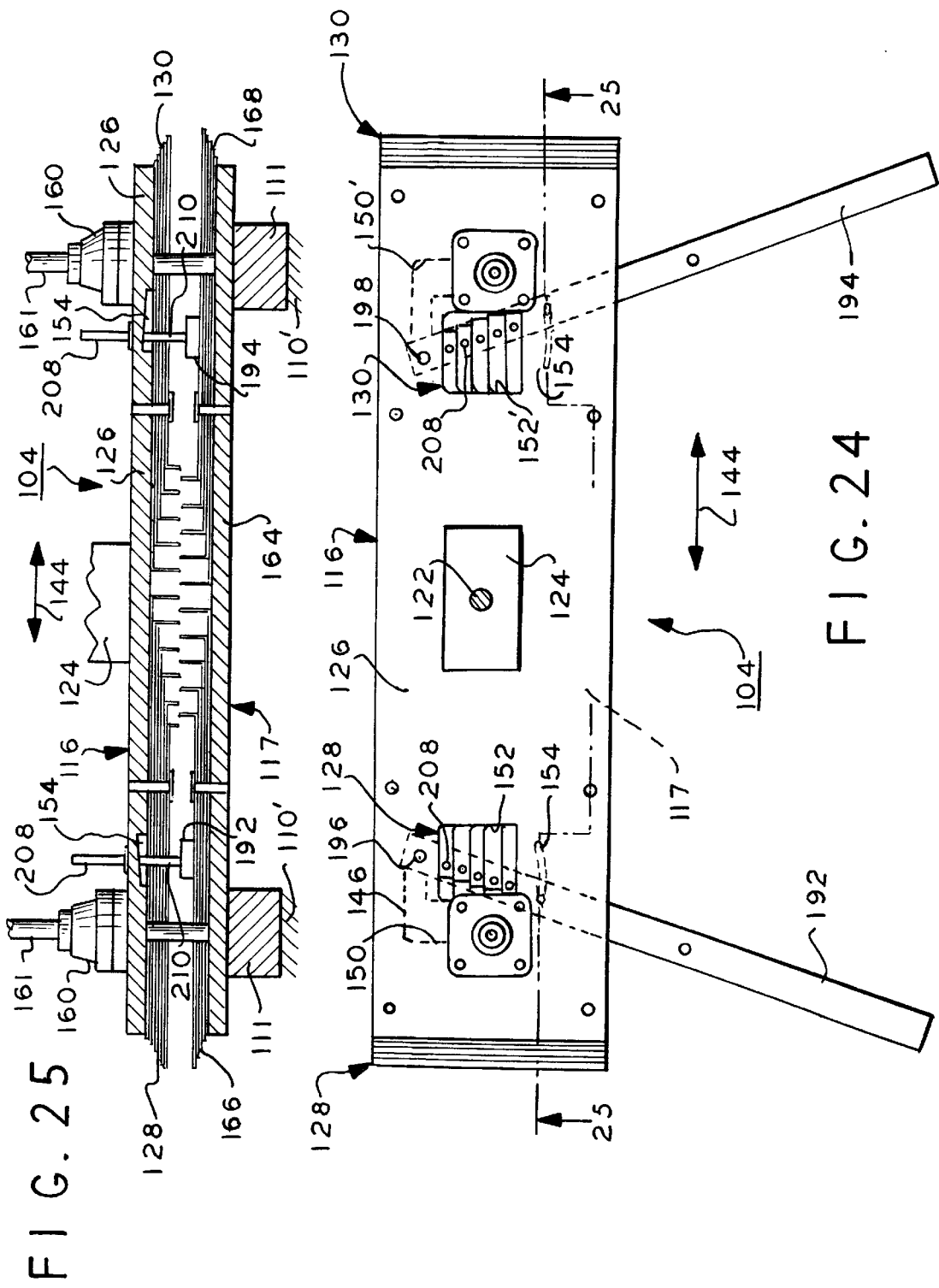

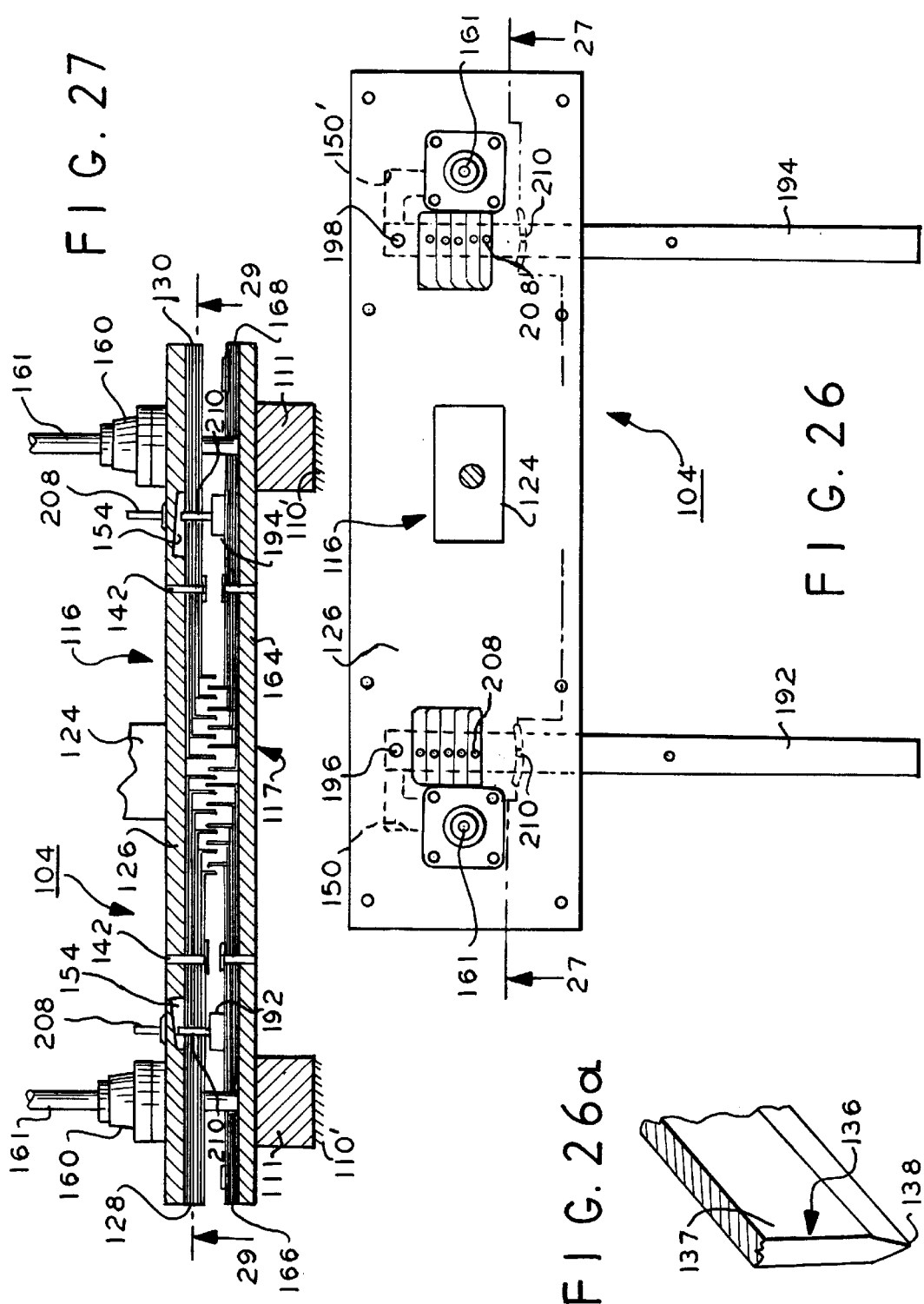

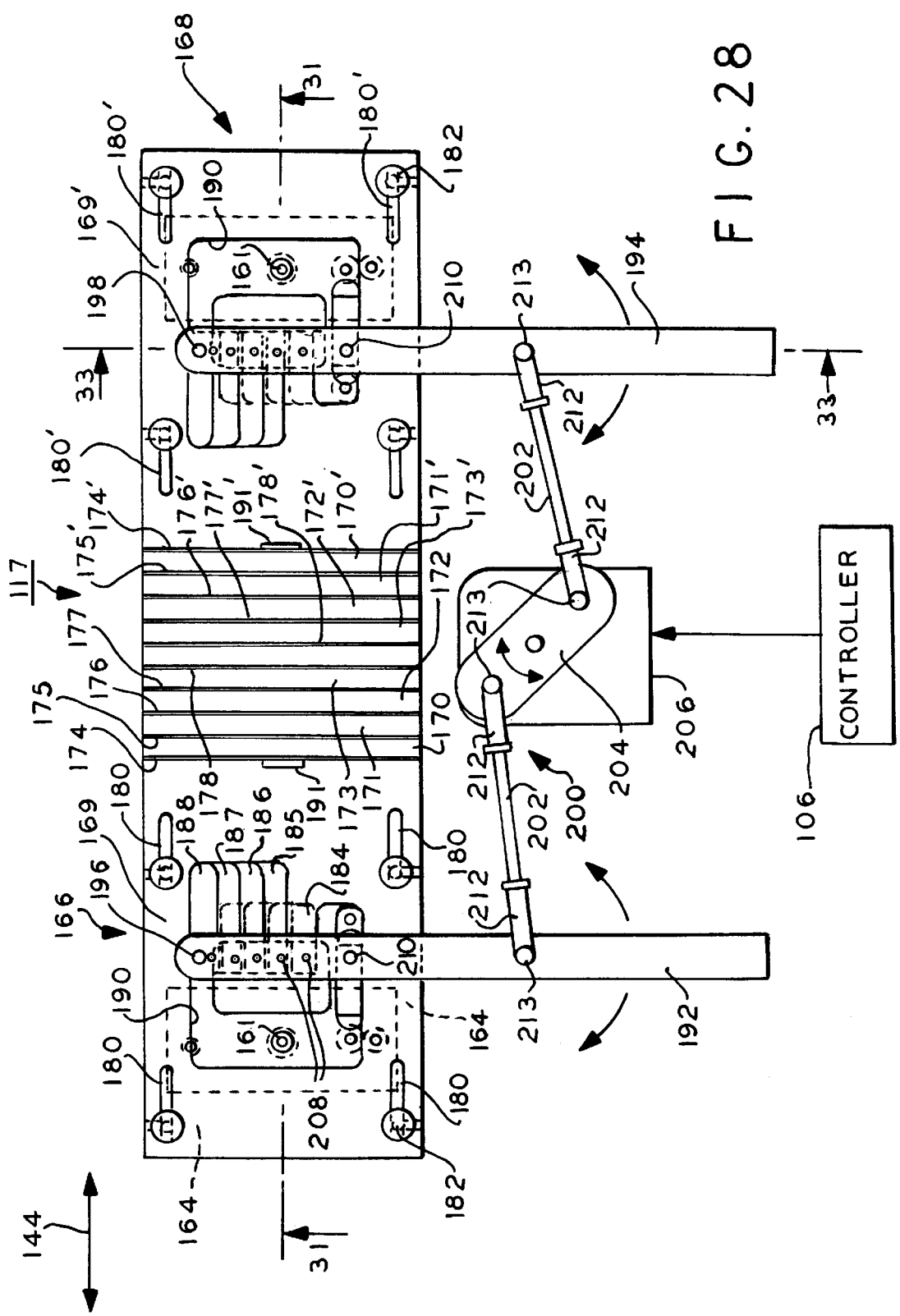

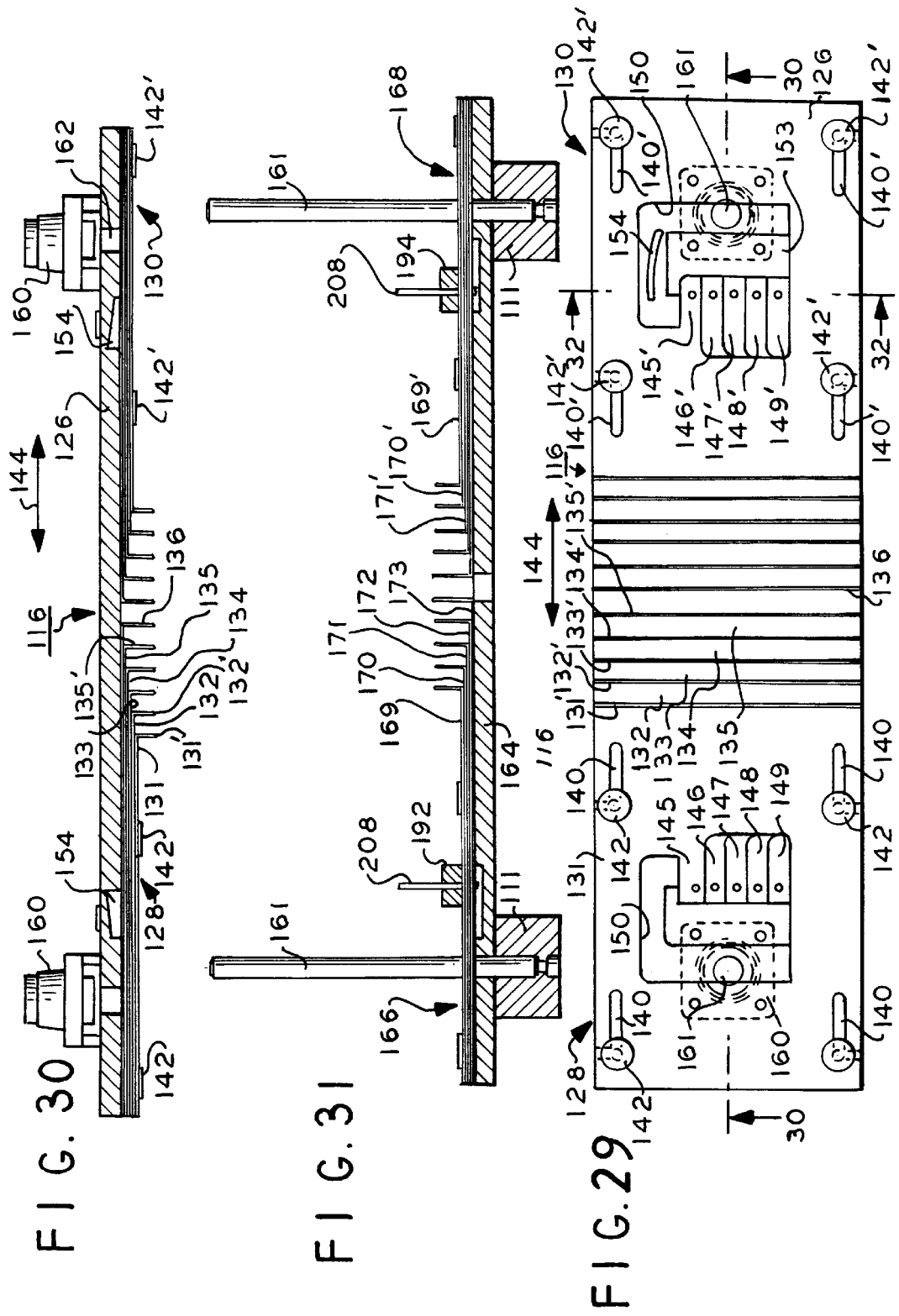

METHOD AND APPARATUS FOR MAKING STRUCTURED PACKING ELEMENT

The present invention relates to apparatus and method for making filters or structured packing elements employed for fluid contacting systems, for example, such as for use with a distillate tower, mixers or catalytic distillation, and more particularly, for fabricating sheet material elements made of porous sintered metal fibers.

Of interest is commonly owned copending patent application Ser. No. 2539 entitled Structural Packing and Element Therefor filed Jan. 2, 1998 in the name of Bettina Paikert et al.

Sintered metal fiber sheets, for example, stainless steel fibers 8–25 $\mu$m (microns) in diameter, can be employed, for example, to make structured packing elements for distillate towers, fluid mixers or catalytic distillation. An example of such packing elements is disclosed in the aforementioned copending application. The material forming the elements has approximately 80–95% voids and may be more or less in certain implementations. The material, which can be, for example, initially formed in flat sheets, may have a thickness of about 50 $\mu$m to about 2 mm.

Examples of catalytic structures are disclosed in U.S. Pat. Nos. 4,731,229 to Sperandio, 5,523,062 to Hearn, 5,189,001 to Johnson, and 5,431,890 to Crossland et al. For example, the '229 patent discloses reactor packing elements comprising alternating fluted and unfluted parts with troughs that are inclined relative to the vertical. Apertures are provided in the sheet material to provide reagent communication flowing through the packing.

As a further example, a structured packing including vortex generators and fluid communication apertures is disclosed in the aforementioned copending application. As shown therein and in the patents mentioned above, structured packing is also provided with undulations, corrugations or pleats to enhance the fluid processing.

A highly porous sintered fibrous sheet material or any other easily compressible deformable material may have the stiffness of and an apparent consistency of conventional cardboard material although comprising metal fibers and is stronger than paper of cellulose fibers. Such material has a high surface to void volume.

The problem with such material is that it is not compressible without permanent deformation and is readily subject to permanent deformation similar to sheet paper board. Unlike cellulose fibrous paperboard material which is resilient when compressed, sintered metal fibrous material when compressed is permanently deformed. This substantially reduces its void volume and either destroys or negatively impacts on the material's function as a filter, a distillation tower and so on. This deleterious effect may be especially so where the fibers are coated with a catalyst for use. For example, in a catalytic distillation process.

Like paperboard, the metal fibrous material is easily deformed, creased and folded, which deformations, creases and folds form undesirable permanent defects in the sheet material. These properties of the material and its sensitivity to compressive pressures and deformation make it difficult to fabricate into complex shapes. For example, as noted above, distillation packing elements typically are formed with vortex generators and folds forming pleats or undulations. Such deformations are required to be introduced in the flat sheet material without compressive loads on the remainder of the sheet surface.

Prior art paper board processing machinery is not suitable for such metal fibrous material. Such machinery tends to process the sheet material with compressive loads, which for resilient paperboard, is not a problem. Such loads are not tolerated without permanent deformation, however, for the sintered metal fiber material. Such loads would permanently deform the fibrous metal material undesirably.

The present inventors recognize a need to provide a process and apparatus for producing a high void to surface area metal fibrous material with or without vortex generators and the like, folds and the like without undesirable permanent deformation of the material. Advantageously, the present inventors recognize such processed material may be employed as a structured packing material that may or may not be coated with a distillation catalyst for reaction processing of the fluids in a distillation tower.

A method according to the present invention for forming a compressible sheet material that permanently distorts in response to a compression load thereon comprises the step of forming a surface feature in the sheet material at a localized region with negligible compression load distortion of the material in the regions of the material adjacent to and externally of the region.

In one aspect, the step of forming comprises forming a foldline channel.

In a further aspect, a further step comprises piercing the material at a piercing site adjacent to the localized region.

In a further aspect, the step of forming includes forming a plurality of spaced foldline channels each at a localized region and then bending the material about each of the channels.

In a further aspect, the step of forming includes forming a plurality of channels in the material with each channel forming a different localized region.

In a still further aspect, the material has opposing broad surfaces, the method further including forming the channels linear and parallel to each other and in the opposing surfaces of the material.

The channels in the opposing surfaces may each lie in a plane normal to the material, the channels on the opposing surfaces lying in alternating planes.

In a further aspect, the step of bending the material about the channels bends the material with negligible compression distortion of the material externally the creases.

The bending in a further aspect includes bending the material in alternating opposite directions to form an undulating material.

In a still further aspect, the material lies in a plane, the method including piercing the material in a given shape and simultaneously bending the shaped pierced material to form tabs extending from the plane.

The material preferably comprises fibrous elements forming a porous member of a given volume.

The elements are preferably metal fibers and the material comprises voids of at least about 80% of the volume.

The step of forming may comprise compressively distorting the material at a distortion region.

An apparatus according to the present invention for forming a compressible material that permanently distorts in response to a compression load of a given magnitude comprises means for holding the material in a fixed position with negligible compression load distortion of the material; and means coupled to the means for holding for forming the held material with a surface feature at a localized region while providing negligible compression load distortion in regions of the material adjacent to and externally the formed region.

In one aspect, the means for forming comprises means for forming the material with a foldline channel.

In a further aspect, means are included for piercing the material at a piercing site adjacent to the localized region.

In a still further aspect, the means for forming includes means for forming a plurality of spaced foldline channels at a corresponding localized region and means for bending the material at each of the channels with negligible distortion of the material external the channels.

In a still further aspect, the means for forming the surface feature includes means for compressively distorting the material in the localized region.

Apparatus for non-compressively holding a sheet material of a given thickness value according to a further aspect of the present invention comprises a base; first and second overlying plates each with facing broad surfaces secured to the base in spaced relation for receiving the material therebetween; and means for relatively displacing the plates from a first position to a second position toward and spaced from each other a distance no less than the value so that the plates do not compress said received material.

IN THE DRAWING

Figure 2:
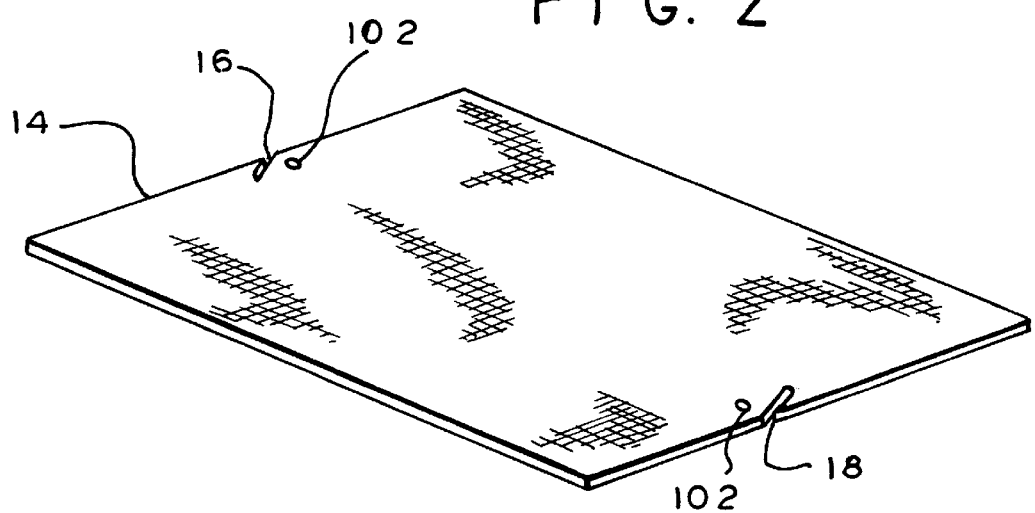
FIG. 2 is an isometric view of a sheet of sintered fibrous metal material prior to processing for use in the embodiment of FIG. 1.
Figure 3:
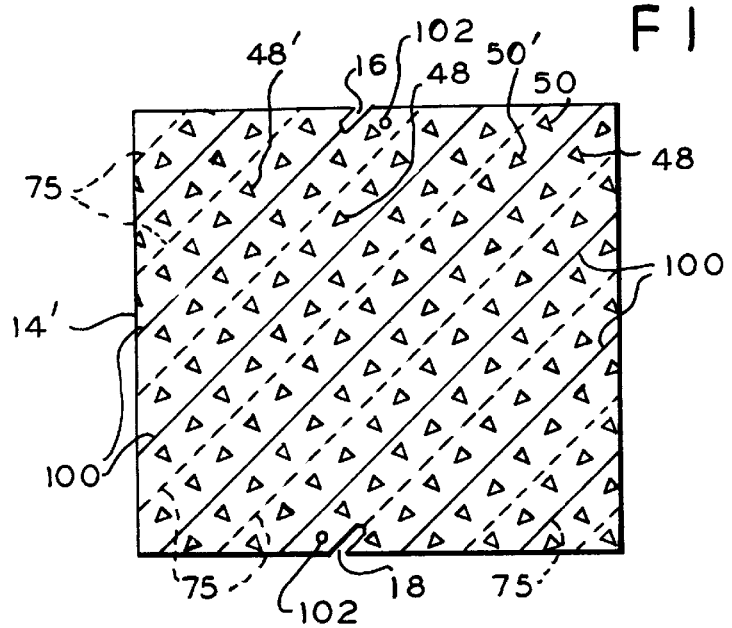
Figure 5:
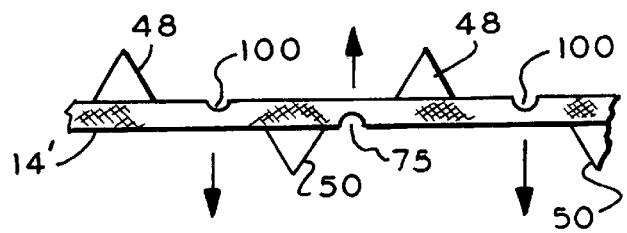
Figure 4:
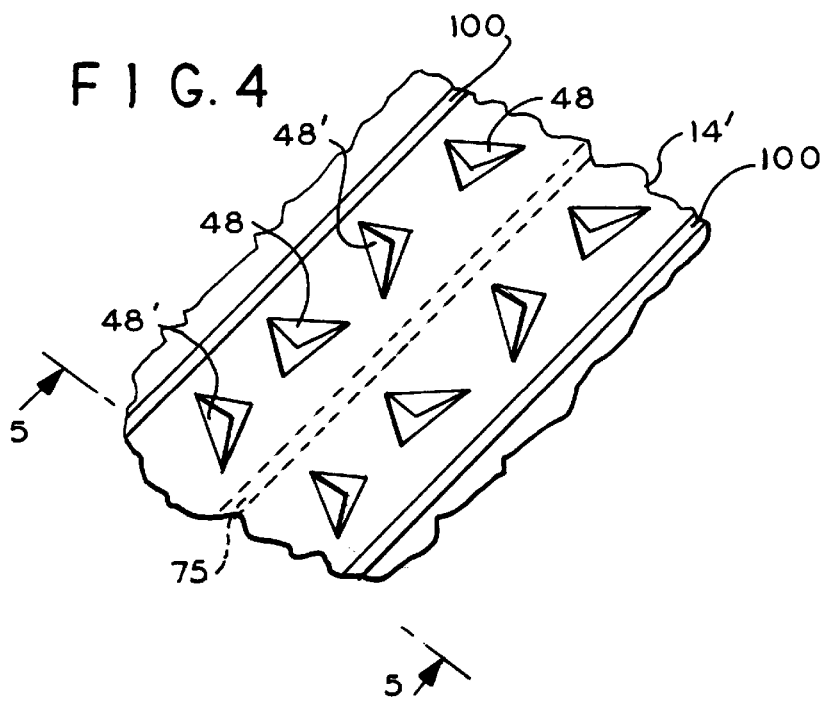
Figure 6:
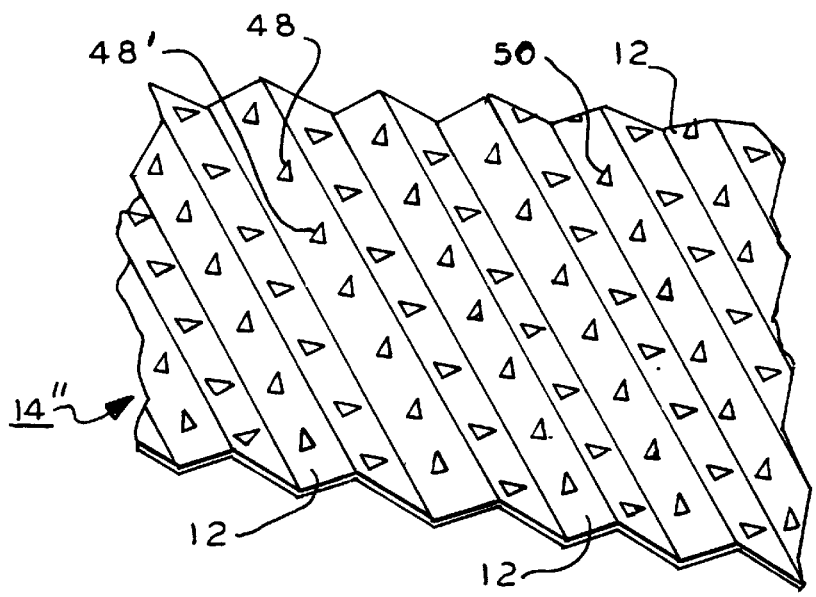
Figure 7:
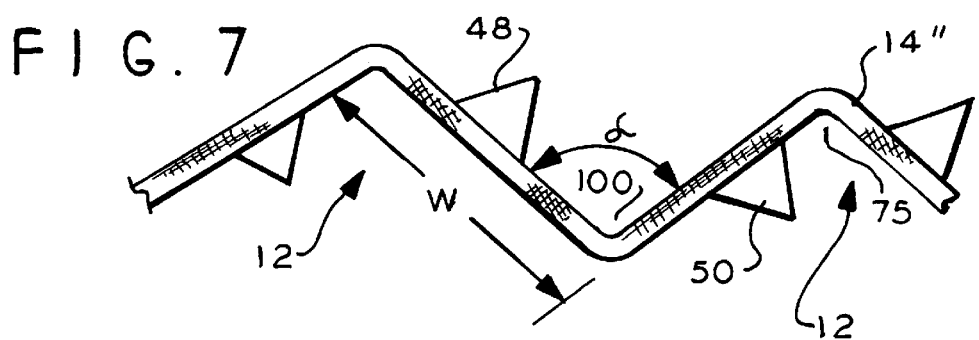
Figure 8:
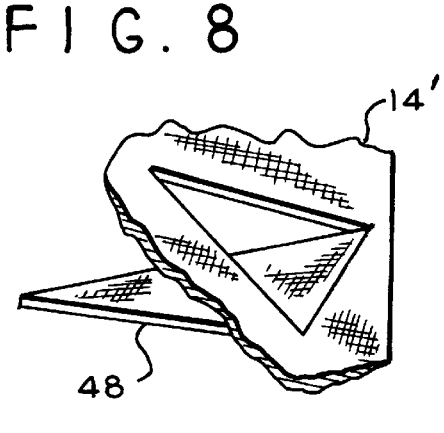
Figure 9:
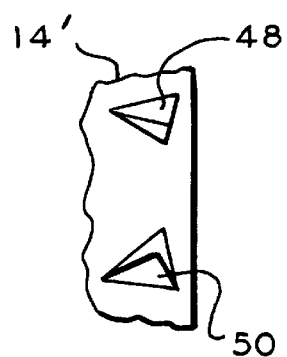
Figure 10:
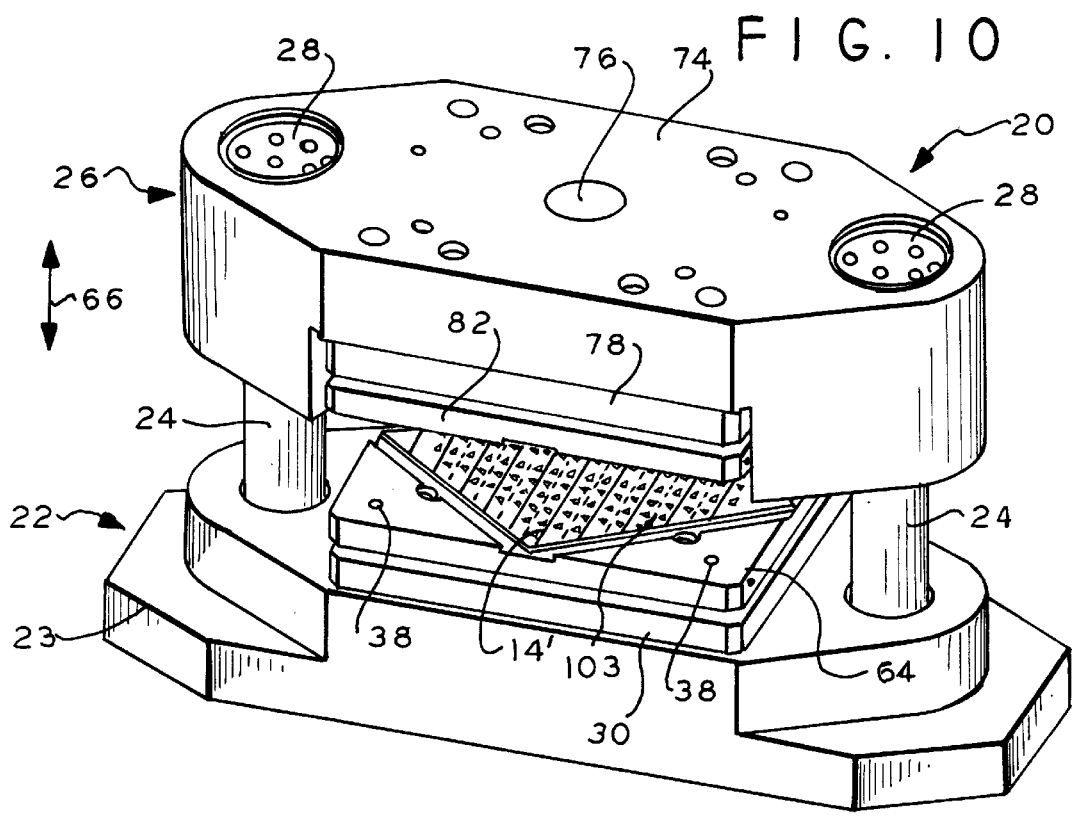
Figure 11:
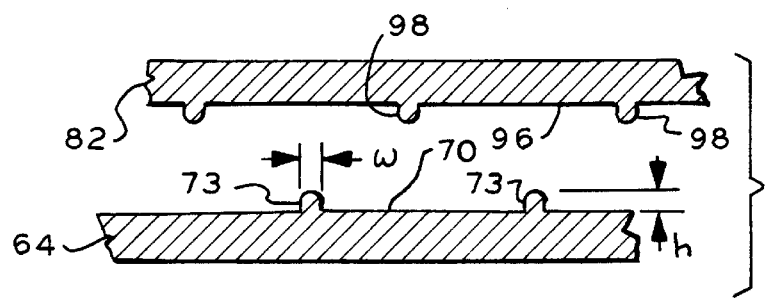
Figure 12:
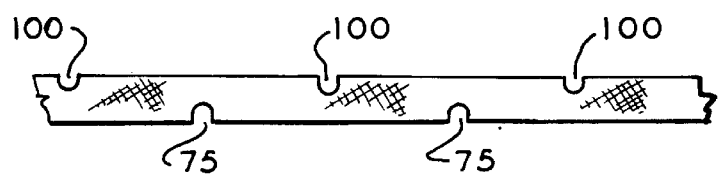
Figure 13:
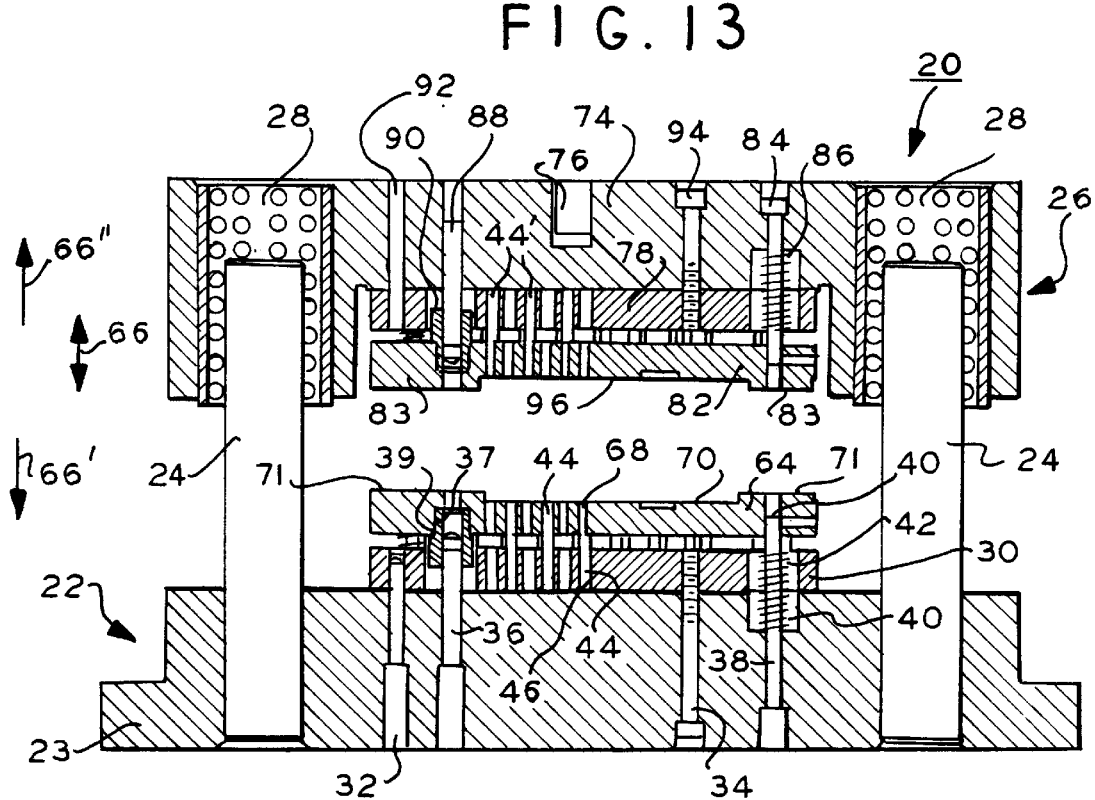
Figure 14:
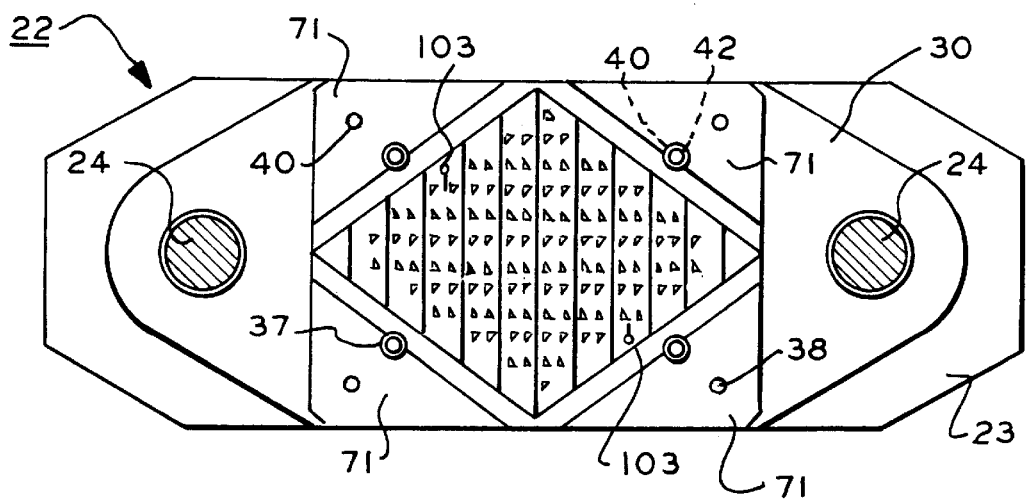
Figure 20:
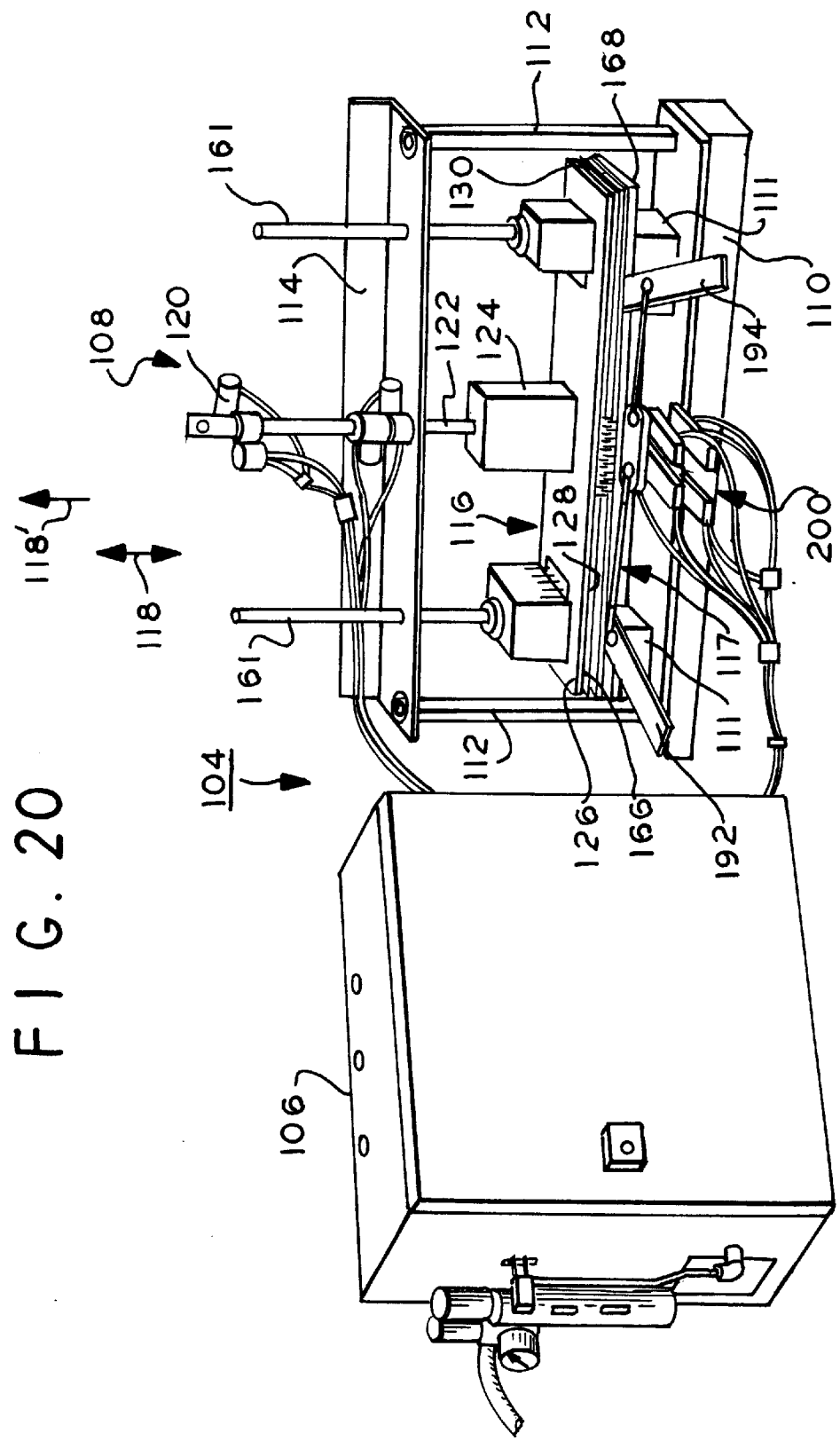
Figure 21:
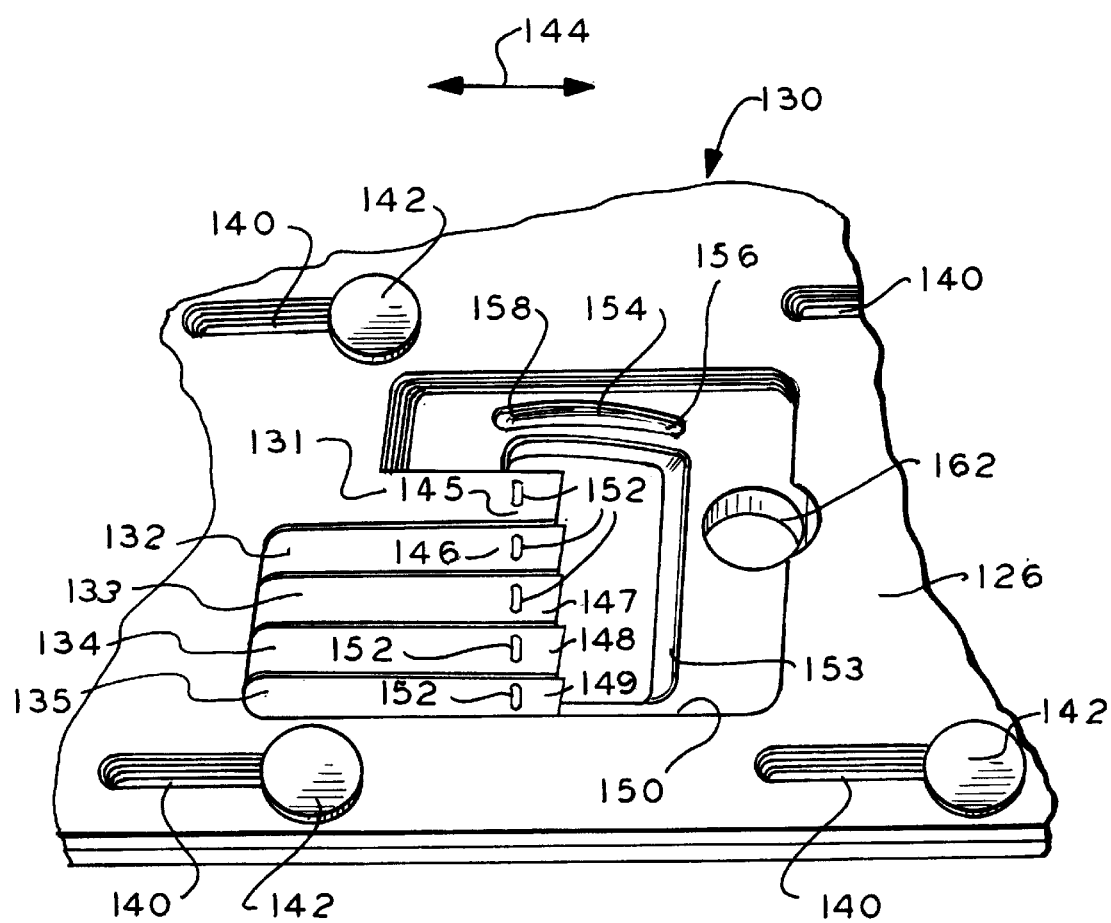
Figure 22:
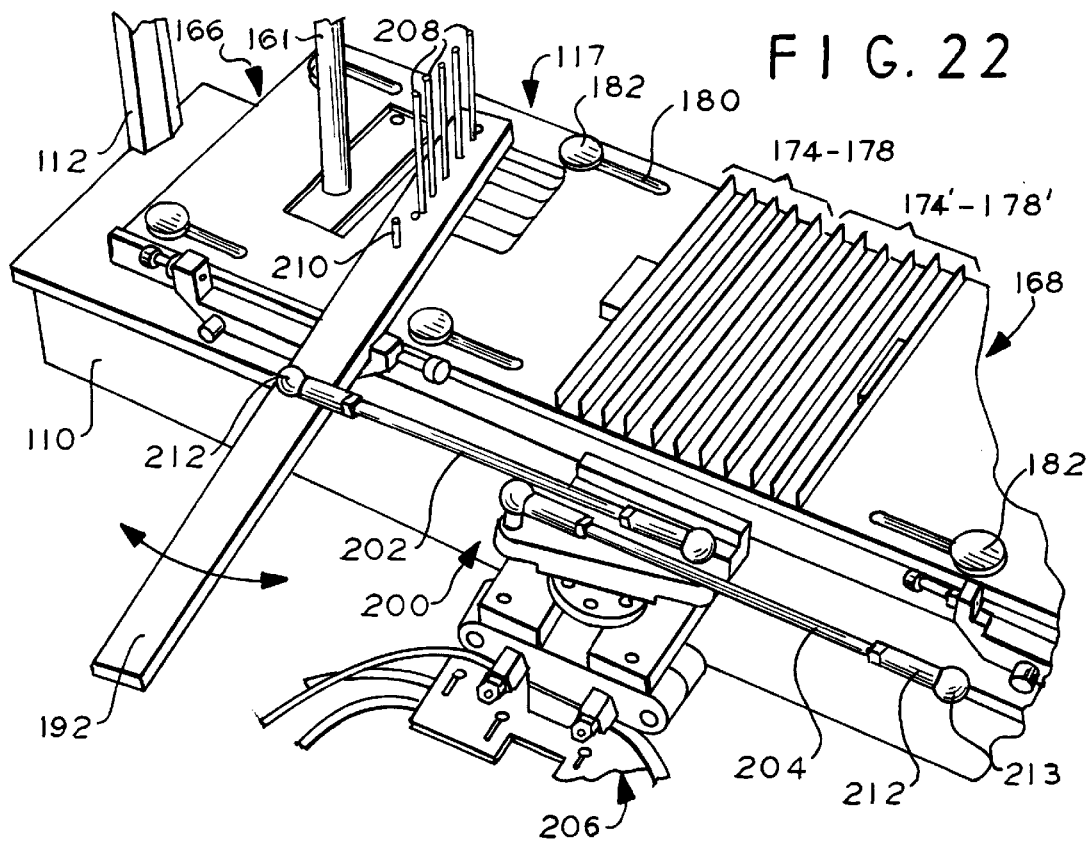
Figure 23:
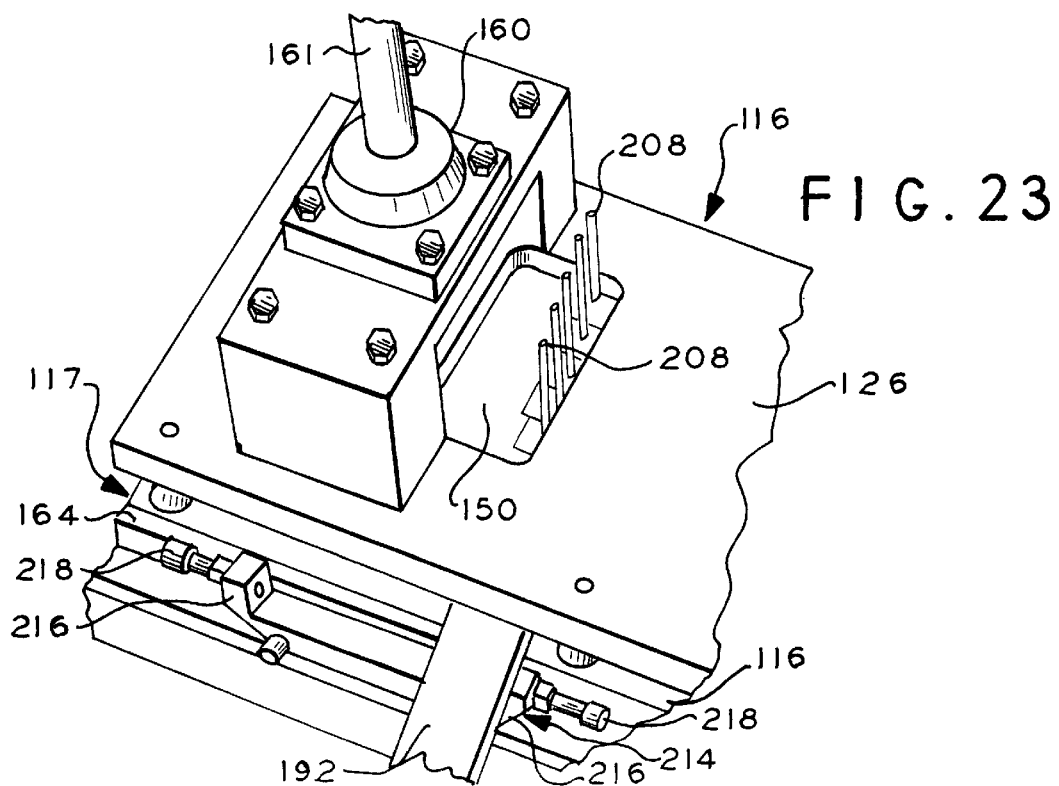
Figure 32:
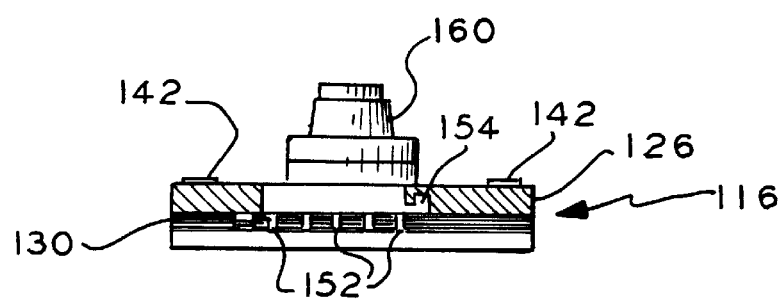
Figure 33:
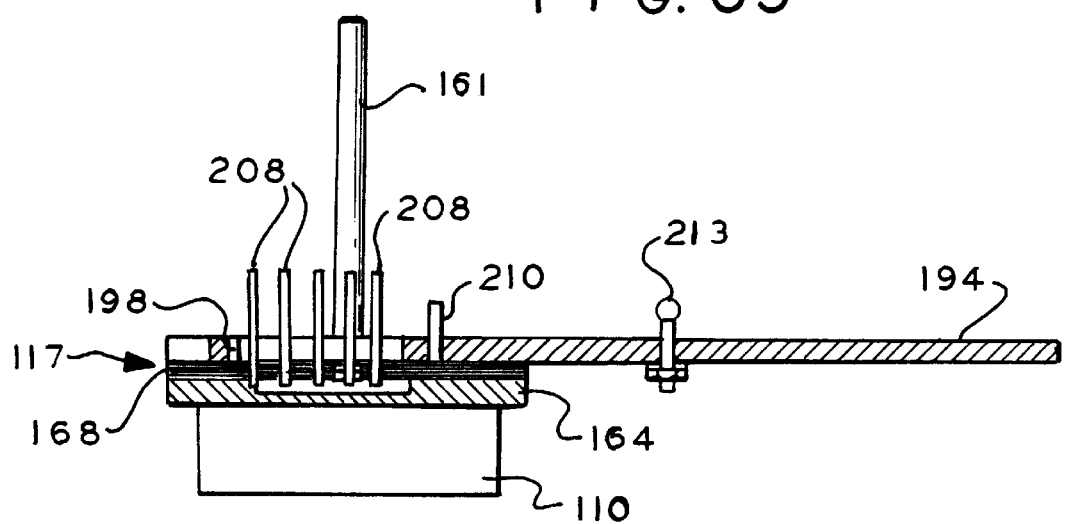

FIG. 3 a top plan view of the sheet of FIG. 2 at an intermediate stage of processing;

FIG. 4 is a perspective view of a portion of the sheet of FIG. 3;

FIG. 5 is an end elevation view of a representative portion of the sheet of FIG. 3;

FIG. 6 is a perspective view of the sheet of FIG. 3 after final formation of the sheet for use in a structured packing arrangement;

FIG. 7 is an end elevation view of a portion of the sheet of FIG. 6;

FIG. 8 is an isometric view of a representative vortex generator in the sheet of FIG. 6;

FIG. 9 is a top plan view of a portion of the sheet of FIG. 6 showing several representative vortex generators;

FIG. 10 is a perspective view of an apparatus for forming the sheet of FIG. 3;

FIG. 11 is a fragmented sectional side elevation view of a portion of the apparatus of FIG. 10 showing the sheet crease forming plates;

FIG. 12 is a side elevation view of the sheet of FIG. 5 without the vortex generators shown;

FIG. 13 is a sectional elevation view of the apparatus of FIG. 10;

FIG. 14 is a sectional plan view of the apparatus of FIG. 10;

FIG. 15 is a further sectional elevation view of the apparatus of FIG. 10;

FIG. 16 is an end elevation view of the apparatus of FIG. 10;

FIG. 17 is an isometric view of a vortex generator cutter employed in the apparatus of FIG. 10;

FIG. 18 is a side elevation view of the cutter of FIG. 17;

FIG. 19 is a sectional elevation view of a portion of the apparatus of FIG. 10 and a porous metal fibrous sheet material being processed in an intermediate stage;

FIG. 20 is a perspective view of an apparatus employed for forming the folds or pleats in the sheet material of FIG. 3;

FIG. 21 is a more detailed bottom perspective view of an upper movable portion of the apparatus of FIG. 20 prior to assembly of the apparatus;

FIG. 22 is a perspective view of a lower plate assembly with a fragmented portion similar to that of FIG. 21 assembled;

FIG. 23 is a more detailed perspective view of a fragmented portion of an upper plate assembly;

FIGS. 24 and 26 are diagrammatic top plan views of the assembled upper and lower plates of the assembly of FIG. 20 with the plates in respective open and closed states prior to and after bending the sheet material of FIG. 3;

FIG. 25 is side diagrammatic sectional elevation view of the apparatus of FIG. 24 taken along lines 25—25;

FIG. 26a is an elevation view of a representative finger tip of the fingers employed for bending the sheet material of FIG. 3 into the folded pleats of FIG. 7;

FIG. 27 is side diagrammatic sectional elevation view of the apparatus of FIG. 26 taken along lines 27—27;

FIG. 28 is a top plan view, partially diagrammatic, of the lower plate assembly of the apparatus of FIGS. 26 and 27;

FIG. 29 is a bottom plan view of the upper pleat forming plate assembly of the apparatus of FIG. 27 taken along lines 29—29;

FIG. 30 is a side elevation sectional view of the assembly of FIG. 29 taken along lines 30—30;

FIG. 31 is a side elevation sectional view of the assembly of FIG. 28 taken along lines 31—31;

FIG. 32 is an end sectional view of the embodiment of FIG. 29 taken along lines 32—32; and FIG. 33 is an end sectional view of the embodiment of FIG. 28 taken along lines 33—33.

Figure 1:
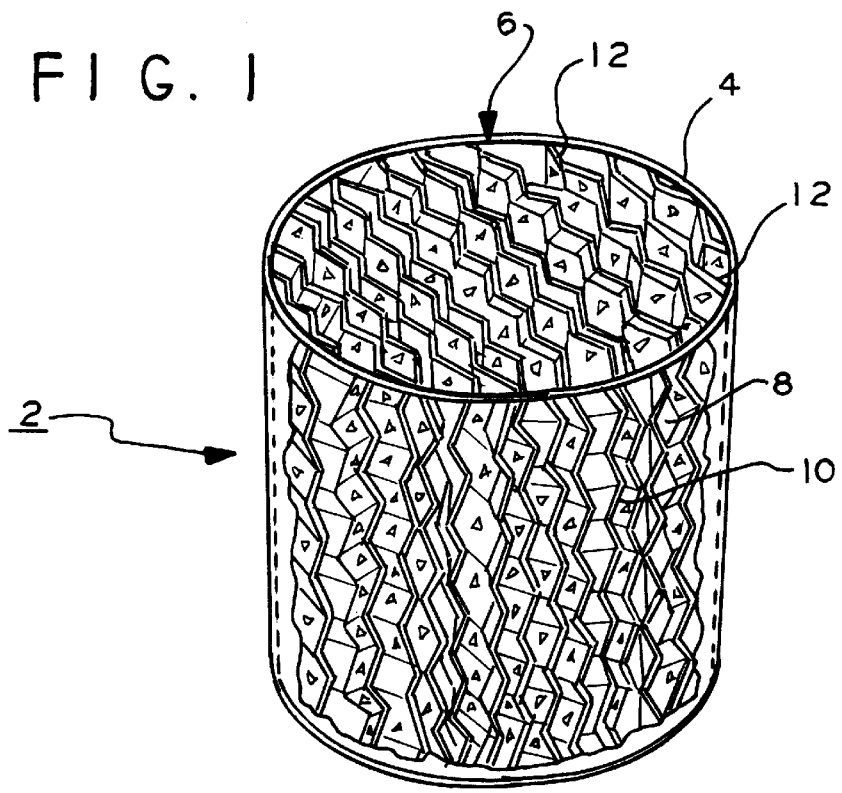
FIG. 1 is a perspective view of a structured packing fabricated according to one embodiment of the present invention.

In FIG. 1, structured packing assembly 2 comprises a cylindrical housing 4 and an assembly 6 of structured packing elements 8, 10 and so on. Each of the elements 8, 10 are fabricated of the identical sheet material composition but differ in peripheral dimensions to form the cylindrical shape of the housing 4 core. The elements 8, 10 have the same length from the top to the bottom of the drawing but have differing widths to accommodate the circular cavity of the housing 4. The elements 8, 10 are identically formed and comprise identically shaped corrugations or pleats 12. The pleats may also be of undulations of other shapes as desired for a given implementation. In this implementation, the assembly 2 is for use in a distillation tower, for example.

In FIG. 2, sheet 14, forming the elements 8, 10 is planar and cut to size from a relatively larger sheet of 3 by 4 foot sheets, for example (not shown). Sheet 14 comprises porous sintered stainless steel or other metal fibers. The sheet 14 has a high surface area to void volume for example, a void volume in the 85% to 95% range discussed in the introductory portion. The fibers and the properties of the sheet material are also as discussed previously herein in the introductory portion.

Sheet 14 is rectangular or diamond polygon shape in accordance with a given implementation. The peripheral dimensions are determined according to the desired size, for example, to fit within the cylindrical housing 4. All of the elements 8, 10 in the housing are arranged parallel. Thus the elements are dimensioned accordingly.

The sheet 14 is formed with two notches 16, 18, at opposite edges. These notches are for aligning the sheet for further processing as will be described below. The location and angle of the notches is important as will also be explained.

In FIGS. 10–16, apparatus 20 for initially forming the sheet 14 includes a base assembly 22 including a base 23, a pair of cylindrical guide and support posts 24 fixed to base 23 and an upper assembly 26. The assembly 26 is supported on the posts 24 by bearing assemblies 28. The upper assembly 26 is selectively displaceable in the vertical directions 66 by an operating device (not shown) which may be a manually operated lever, a pneumatic or motor operated device or other power source (not shown). A pneumatic device can provide an air cushion for providing a damping action.

The base assembly 22 includes a plate 30 fixed to the base 23 by locating guide pins 32 and bolts 34, FIG. 13. An array of four cylindrical guide pins 36 are secured fixed to the base 23 and pass through the plate 30. The pins 36 each are slidably mounted in a mating sleeve 37. The sleeves 37 are press fit in mating bores in movable die plate 64. The sleeves 37 each have a shoulder 39 abutting the plate 64. The sleeves 37 guide and locate the plate 64 relative to the plate 30 as the plate 64 displaces.

An array of four bolt pins 38 are secured to plate 30 and pass through a chamber 40. Pins 38 also are in mating bores in plate 64. A compression spring 42 is in each chamber 40. The springs 42 normally urge the plate 64 upwardly direction 66".

An array of cutters 44 is fixed to plate 30 in a corresponding array of bores 46. The cutters 44 form vortex generators 48, 48' (FIGS. 4–9) in the sheet 14 (FIG. 2) in the process of forming an intermediate stage sheet 14'. The vortex generators 48, 48' are mirror image triangular tabs projecting from the plane of the sheet material of sheet 14' in alternating fashion, for example. The generators 48, 48' are arranged in parallel linear arrays in accordance with a given design configuration of the packing elements. The orientation, shape, number and configuration of the generators is in accordance with a given implementation, and are shown by way of example in the FIGS.

In FIGS. 17 and 18, a representative cutter 44 comprises a cylindrical shank 52 which fits in a bore 46 and may be press fitted fixedly attached in the bore to plate 30 (FIGS. 13 and 15). Extending from the shank 52 is a second shank 54, which is triangular in plan view. The cutter edge 56 tapers at one side of the shank 54 and edge 58 tapers at a different taper at a second side of the shank 54 forming a tapering cutting surface 60 having a further tapering edge 62. The cutting edges 56, 58 and 62 project above the plate 30. The cutters 44 are secured in the bores 46 in the desired array for the vortex generators 48, 48'. The shanks 54 and cutting edges extend above the plate 30.

Movable die plate 64 is slidably attached to pins 36 and 38 for vertical displacement in directions 66. Plate 64 is resiliently supported on springs 42. Plate 64 is normally in an upper quiescent position as shown in FIGS. 13 and 15. Plate 64, FIG. 15, also has a plurality of bores 68 in an array, each bore 68 accommodating a separate cutter 44 shank 54 (FIG. 17). The cutting edges of the cutters 44 are just below the top surface 70 of the plate 64 in the normal upper quiescent position of the plate 64. The lowermost sheet material processing position of plate 64 permits the cutters 44 cutting edges to protrude above the plate 64 top surface 70. The amount that the plate 64 is displaced is determined by the gap between the plates 30 and 64.

Plate 64 has four raised peripheral triangular mesa regions 71 relative to surface 70. The raised regions 71 form surface 70 into a diamond shaped recess.

In FIG. 11, the plate 64 surface 70 preferably has an array of upstanding linear ridges 73 extending therefrom in the present embodiment. The ridges 73 are parallel and are equally spaced, with an array of cutters 44 aligned between adjacent ridges 73 and with cutters also linearly aligned in a direction normal to the ridges 73. The ridges 73 have a height h preferably about 0.4 mm or about 50% of the thickness of sheet 14. The ridges have a width w also of preferably about 0.4 mm in this embodiment. The ridges 73 have a preferably curved edge with parallel sides. However, the ridges 73 may have other shapes such as rectangular or triangular in end view or transverse section.

The ridges 73 are used to form surface features in the sheet material 14. In particular, the ridges form foldline creases or channels 75 in the sheet 14, as shown in FIGS. 3–5 and 12. The ridges 73 penetrate into the sheet 14 an amount that just equals the height h of the ridges in a manner to be explained. The broad surface 70 (FIGS. 13 and 15) of the sheet 14 just touches and lays against the plate 64 surface without any compression and deformation of the sheet 14 material in the region between the ridges 73 and the crease foldline channels 75 in a manner to be explained. The guide pins 38 guide the plate 64 during its displacement.

In the alternative, the channels may be formed by cutting devices (not shown). In this case the ridges are optional and not necessary. A second apparatus (not shown) would hold the sheet material. Slots (not shown) in the second apparatus permits cutting devices to cut the channels in the material without compression distortion of the material.

The amount of travel of the plate 64 is such that the cutting edges of the cutters 44 protrude above the surface 70 of the plate 64 a distance to penetrate through the sheet 14 and form the vortex generators 48, 48'. This travel amount is set by the gap between the plates 30 and 64.

The upper assembly 26, FIGS. 10, 13 and 15, comprises a support base plate 75 having a recess 76 for receiving a mechanism (not shown) for selectively displacing the plate 75 vertically in directions 66. In this embodiment, a lever (not shown) is manually operated to displace the assembly 26 in directions 66. The base plate 75 slidably displaces via bearing assemblies 28 along posts 24. The assembly 26 normal quiescent position is in its uppermost position as shown in the figures.

Fixedly secured to base plate 75 is a fixed upper plate 78. An array of bores 80 are in plate 78. The bores 80 are aligned vertically with the bores 68 in the lower die plate 64. A portion of the bores 80 are dimensioned and located to receive the cutters 44 in the lower base assembly 22 plate 64. A second portion of bores similar to bores 46 are in plate 64 to receive cutters 44'. A second portion of cutters 44' identical to cutters 44 are in others of the bores 80 and fixed to plate 78. The cutters 44 in the lower plate 64 generate vortex generators 48, FIG. 5, and the cutters 44' in the fixed upper plate 78 generate vortex generators 50. The cutters preferably penetrate into the bores of the opposing die plates.

An upper die plate 82 is resiliently secured to plate 78 by four bolt guide pins 84 and mating compression springs 86. An array of four pins 88 and sleeves 90 (one each being shown) identical to respective pins 36 and sleeves 37 locate and guide the movable upper plate 82. Locating pins 92 and bolts 94 (one each being shown) are fixed to plate 75 for locating and securing the plate 78 to plate 75.

In FIG. 11, the movable die plate 82 surface 96 has an array of upstanding ridges 98 depending therefrom toward the lower die plate 64. The ridges are linear and parallel and are equally spaced, the same spacing as ridges 73 but alternating therewith vertically. These ridges also form surface features, e.g., channels, in the sheet material and would be optional, in the alternative, should cutting devices (not shown) be used to cut the channels. An array of cutters 44' (FIG. 13) are aligned between adjacent ridges 73. The cutters 44' are also linearly aligned in a direction normal to the ridges 98. The ridges 98 have a height h preferably about 0.4 mm or about 50% of the thickness of sheet 14. The ridges 98 have a width w also of preferably about 0.4 mm in this embodiment. The ridges 98 have a preferably curved edge with parallel sides. However, the ridges 98 may have other shapes such as rectangular or triangular in end view or transverse section. The ridges 73 and 98 preferably are identical.

The ridges 73 and 98 may have other dimensions and shapes in accordance with a given implementation, the heights and widths being given by way of example only for a given sheet material. The height may be set to minimize the degree of compression and the width set at a value to minimize the surface area magnitude that is compressed.

Plate 82 has four raised triangular peripheral mesa regions 83 relative to surface 96. The raised regions 83 form surface 96 into a diamond shaped recess. The regions 83 overly and are aligned with the regions 71 on lower plate 64. The recesses formed by the regions 71 and 83 form a single chamber when the plates 64 and 82 abut a these regions 71 and 83. The chamber is sufficiently thick such that the sheet 14 placed in the so formed combined chamber is not compressed by surfaces 70 and 96 when closed to form the vortex generators 48, 50 and crease channels 75, 100, FIG. 5. The surfaces 70 and 96 barely touch the sheet 14 during the formation of the creases and vortex generators. The abutting regions 71 and 83 limit the depth of penetration compression of the ridges 73 and 98, FIG. 11, into the sheet 14. This depth can be adjusted, if desired by providing adjustment screws (not shown) in the regions 71 or 83. In the alternative, shims (not shown may be placed in these regions to also adjust the amount of penetration of the ridges 73 and 98 into the sheet to form the desired crease foldlines.

The ridges 98 form crease foldline channels 100 in the sheet 14, as shown in FIGS. 3–5 and 12. The mesa regions 71 and 83 are provided a height value above the plane of respective surfaces 70 and 96 to limit the amount of travel of the upper die plate 82 during its displacement in direction 66" toward lower die plate 64 during formation of the sheet 14', FIG. 3. This is so that the ridges 98 penetrate into the sheet 14 an amount that just equals the height h of the ridges. That is, when the mesa regions 71 and 83 abut, the depth of penetration of the ridges into the sheet 14 is limited and simultaneously precludes compressive deformation of the sheet 14 between the localized distortion regions at the crease foldlines.

In this way, the broad surface 96 (FIGS. 13 and 15) of the sheet 14 just touches and lays against the plate 82 surface 96 during formation of the foldline channels 100 and vortex generators 50. This contact is without any compression and deformation of the sheet 14 material in the region between the ridges 98 and the foldline channels 100. The guide pins 84 and 88 guide the plate 82 during the plate displacement during formation of the foldline channels and vortex generators, FIGS. 3 and 13.

The vortex generators 50 are in alternating rows with the vortex generators 48, alternating on opposite sides of the sheet 14', FIGS. 3–5. While one row of generators is disposed between adjacent foldline channels 75 and 100 which also alternate in vertical orientation as seen in FIG. 5, more rows or fewer generators may be provided according to a given implementation.

The amount of travel of the plate 82 is such that the cutting edges of the cutters 44' also protrude above the surface 96 of the plate 82. This protrusion is that distance to penetrate through the sheet 14 and form generators 50 and 50'. The difference between the generators 50, 50' and 48, 48' is their relative orientation, which is not important for purposes of the present invention. What is important is that the lower and upper die plates 64 and 82, respectively are set to abut at regions 71 and 83 so that the respective surfaces 70 and 96 just contact the sheet 14 when the foldline channels and vortex generators are fully formed. This eliminates possible deformation of the sheet 14' during such formation that might otherwise occur.

The sheet 14, FIG. 2, is located in the fixtures of the apparatus 20 by notches 16, 18 in the sheet 14 (FIG. 2) and a pair of mating guide pins 103 in the plate 64, FIGS. 10 and 14. The notches 16, 18 and holes 102, FIG. 2, in the sheet 14 are formed by other apparatus (not shown) during the cutting of the sheet 14 from larger sheets. No deformation of the sheet 14 occurs during such formation and cutting. Different size sheets 14 are formed for use in the packing assembly 2, FIG. 1. Holes 102 serve to permit an operator to properly orient the final formed sheets 14', FIG. 6.

The sheets 14', FIG.3, are now ready for formation of the pleats 12, FIGS. 1, 6 and 7. The pleats 12 are in linear rows of preferably identical transverse widths, W, FIG. 7. Preferably the pleats 12 are at an angle α of about 90°, but may be at other angles as desired. Each pleat 12 is formed by a strip containing vortex generators 48, 48' in a row or vortex generators 50, 50' in another row. The generators 48 face in one direction and the generators 50 face in the opposite direction from the surface of the formed sheet 14", FIGS. 6 and 7.

Apparatus 104 forms the pleats 12, FIG. 20. Identical reference numerals or primed numerals in the different figures refer to identical structures or identical mirror image structures of the unprimed numerals. The apparatus 104 forms the pleats 12 without any permanent deformation of the sheet 14'. Such deformation includes compression, creases, wrinkles or other deformation of the material between any of the foldline channels 75 and 110, FIG. 12.

In FIG. 20, the apparatus 104 includes a pneumatic controller 106, which is commercially available, and a pleat forming assembly 108. The assembly 108 includes a base 110, a pair of upright support posts 112 and an upper angle iron support 114 bolted fixed to posts 112.

An upper pleat forming assembly 116 includes a plate 126 and is movably secured to support 114 for displacement in the vertical directions 118 along bearing rods 161. A lower pleat forming assembly 117 is fixed to base 110 by supports 111. The upper and lower assemblies 116 and 117 mate and cooperate to form the pleats 12 in the sheet 14", FIG. 6.

A pneumatic operator 120 moves assembly 116 vertically upwardly via piston 122. operator 120 is secured to the support 114. Piston 122 is secured to assembly 116 by connector 124. Connector 124 is secured to plate 126. The operator 120 may be a solenoid and the like operated by controller 106. The controller 106 pneumatically lifts the assembly 116 vertically from lower assembly 117, direction 118', and releases the assembly 116 which falls by its weight via the force of gravity toward lower assembly 117. This falling action is dampened by the pneumatic action of the operator 120, which provides an air cushion.

In FIG. 30, in the upper assembly 116, two sets 128, 130 of mirror image identical pleat forming plate members 131, 132, 133, 134 and 135 are slidably secured to and beneath the plate 126 at opposite ends of the plate 26 and coplanar with each other. There are five pleat forming plate members 131, 132, 133, 134 and 135 in each set, set 128 being representative. Each member 131–135 comprises a planar metal sheet with linear right angle fingers 131', 132' and so on at an inner edge. Member 131 has finger 131', member 132 has a finger 132' and so on. A central finger 136 is fixed to plate 126 between the two sets of fingers. All of the fingers are equally spaced from each other the same spacing as the foldline channels 100, FIG. 5. Each finger depends from its plate member and is dimensioned to be received in a corresponding foldline channel of the sheet 14', FIG. 3.

Each finger extends transversely the same extent, e.g., completely across the corresponding pleat forming member 131–135 (normal to the sheet of drawing FIG. 30). The fixed finger 136 also has the same transverse extent as the other fingers. Representative finger 136, FIG. 26a, has a planar sheet metal shank 137 that tapers to its depending edge 138. The edge 138 has a transverse width the same as that desired for the foldline channels 100, the edges 138 engaging the foldline channels 100. The fingers all depend that distance in which their depending edges 138 are all coplanar for engaging the foldline channels 100 uniformly in the same plane.

In FIGS. 21, 29 and 30, slots 140 are formed in each pleat forming member 131–135. A fastener 142 is secured to plate 126 and passes through a corresponding slot 140 so that the members 131–135 may slide horizontally relative to each other in directions 144. The fasteners 142' in slots 140', FIG. 29, permit the set 130 to slide in an opposite direction as the set 128 in directions 144.

Thus, in FIG. 29, set 128 can slide to the left in the drawing and the set 130 can slide to the right, directions 144. Both sets in FIG. 29 are in their most central position in directions 144 with their respective fingers closest to the central finger 136. This is referred to hereinafter as the closed position. When the fingers are opened so that the spacing therebetween is the greatest, this is referred to hereinafter as the open position. FIGS. 26, 27 and 30 show the closed position of the fingers and FIGS. 24 and 25 show the open position.

The pleat forming members of the sets 128 and 130, FIGS. 21 and 29, each have an overlying opening 150 juxtaposed with a corresponding opening in the plate 126. The members 131–135 of set 128 and the corresponding members of the other set 130, FIG. 28, each have respective extensions 145–149 in the opening 150. Each extension has an elongated hole 152 in the opening 150 (FIG. 21). Plate 126, FIG. 21, has a bore 162 for receiving bearing rod 161.

The lower pleat forming assembly 117, FIGS. 25, 27, 28 comprises a lower plate 164. Plate 164 is supported on supports 111 secured to base 110 represented by symbols 110', FIGS. 25 and 27. Circular cylindrical bearing rods 161 extend upwardly from the supports 111 through the plate 164. The bearings 160 of the upper assembly slide vertically on the rods 161.

In FIGS. 28 and 31, two sets 166, 168 of mirror image identical respective pleat forming plate members 169, 170, 171, 172 and 173 of set 166 and members 169', 170', 171', 172' and 173' of set 168 are horizontally slidably secured to each other and over the plate 164 at opposite ends of the plate 26 and coplanar with each other. There are five pleat forming plate members in each set, set 168 being representative. These plate members are substantially similar to and correspond to the plate members 131–135 of the upper assembly 116 in that each member comprises a planar metal sheet with respective linear right angle fingers 175, 175, 176, 177 and 178 (FIG. 28) at an inner member edge.

However, there is no central finger such as finger 136 fixed to plate 126. All of the fingers are equally spaced from each other the same spacing as the foldline channels 75, FIGS. 5 and 12 in the open position of FIGS. 24 and 25. Each finger extends upwardly from its plate member and is dimensioned to be received in a corresponding foldline channel 75 of the sheet 14', FIG. 3.

Each finger, e.g., fingers 175–178, extends transversely the same extent, e.g., completely across the corresponding pleat forming members 169–173 (normal to the sheet of drawing FIG. 30). The fingers all extend upwardly that distance in which their extended edges are all coplanar for engaging the sheet 14' foldline channels 75, FIG. 3, uniformly in the same plane in the open position of FIGS. 24 and 25.

A projection 191 is attached to end finger 175 at the finger upper edge and a like projection 191' is attached in mirror image fashion to the mirror image finger 175'. The projections 191 and 191' receive the respective end notches 16 and 18, FIG. 3, of the sheet 14'. These projections align the foldline channels in the sheet 14' exactly over the edges of the respective corresponding fingers of the lower assembly 117. In this way the fingers each engage a corresponding foldline channel 75 of the sheet 14'. This also aligns the foldline channels 100 with the overlying fingers of the upper assembly 116.

The pleat forming members of the sets 166 and 168 each have an opening 190 corresponding to the opening 150 in the members of the upper assembly 116, FIG. 21. Members 169–173 and 169'–173', FIG. 28, each have respective extensions 184–188 overlying the opening 190. Each extension has an elongated hole aligned with the respective extension openings 152 (FIG. 21) in the upper assembly 116 pleat forming members.

The fingers of the upper assembly 116, FIG. 27, are aligned vertically medially between the fingers of the lower assembly 117 as shown. This is to align the fingers with the corresponding foldline channels 75 and 100 in the sheet 14', FIGS. 5 and 19. The fingers of the upper and lower pleat forming assemblies have sufficient height so as to receive the vortex generators 48 and 50, FIG. 5. therebetween during folding of the sheet 14'.

In FIG. 28, slots 180 are formed in each pleat forming member 169–173 and corresponding slots 180' in the mirror image pleat forming members 169'–173'. A fastener 182 is secured to plate 164 and passes through a corresponding slot 180, 180'. The members 169–173 and 169'–173' of each set 166 and 168 are selectively slid horizontally in opposite directions 144 relative to each other. The fasteners 182 in slots 180, FIG. 29, permit the set 166 and 168 to so slide.

In FIG. 28, pleat forming member set 166 can slide to the left in the drawing and the set 168 can slide to the right, directions 144. Both sets in FIG. 28 are in the closed position with their most central position in directions 144. When the fingers are located so that the spacing therebetween is the greatest in the opposite directions 144, they are in -the open position. FIGS. 26, 27 and 28 show the closed position of the fingers and FIGS. 24 and 25 show the open position.

In FIGS. 22 and 28, a pair of levers 192 and 194 are pivoted to plate 164 at respective pivots 196, 198. The levers 192 and 194 are connected by a crank mechanism 200. The mechanism 200 comprises two links 202 and a central crank

204. The links 202 are threaded and include an adjustment screw sleeve 212 with a nut at one end of the sleeve for adjustably receiving the threaded link and a ball socket 213 at the sleeve other end attached to each lever, FIG. 28, and to the crank 204. Rotation of the links about their longitudinal axes provides adjustment of the link length between the crank 204 and levers 192 and 194. This adjusts the travel of the pleat forming members as will be explained below. A pneumatic motor 206 rotates the crank 204. Controller 106 selectively drives motor 206, FIG. 20.

In FIG. 23, a stop device 214 is attached to the base 110 adjacent each lever to limit the associated lever rotation. Representative device 214 comprises two spaced limit blocks 216 and an adjustment screw 218 associated with each block for adjustably setting the amount the lever 192 may rotate.

A linear array of five pins 208 are attached vertically to each lever 192 and 194 adjacent to the corresponding pivot 196 and 198, FIGS. 22–28 and 33. The pins 208 extend vertically through each lever and project above and beneath each lever. Each pin passes through and engages a corresponding elongated hole 152, FIG. 21, of each extension, e.g., 145–149, of the respective pleat members of the upper assembly 116 and lower assembly 117. In addition, a cam pin 210, FIGS. 22, 28, and 33, rides against the ramp surface of ramp 154, FIGS. 25, 27 and 32.

The crank mechanism 200 as it rotates in response to the motor 206 simultaneously opens and closes the levers 192 and 195 in the direction of the arrows, FIG. 28. Normally the levers are in the quiescent open position of FIG. 24 s0 that the planes of the edges of the fingers of the upper and lower pleat forming assemblies 116 and 117 are spaced apart and just engaged with the foldline channels of the sheet 14'.

In the closed position, these planes are situated as depicted in FIG. 27 forming an interdigitated relation among the fingers. This latter position is after the sheet 14' is folded as in FIG. 7. These two different open and closed positions are determined by the cammed position of the camming pin 210, FIG. 33, abutting the ramps 154, FIG., 32.

In operation, FIG. 20, the upper assembly 116 is lifted by operator 120 in response to the operation of the controller 106. The levers 192 are in the open position (FIG. 24). The fingers of the pleat forming member of the upper and lower sets 128, 130 and 166, 168, FIG. 25, are spread apart the maximum amount corresponding to the spacing of the foldline channels 75 and 100 in the sheet 14' (FIG. 5). The sheet 14' is then placed over the fingers of the lower sets 166, 168, with the fingers of the lower sets engaged with the foldline channels 75 (FIG. 5). This alignment is assisted by placing the notches 16 and 18 of the sheet 14' into the projections 191 and 191' (FIG. 28) at the end fingers 175 and 175'. At the same time the controller 106 is not operating the motor 206 (FIG. 28) so that the levers 192 remain open.

The controller 106 is then operated to open the valving to the operator 120, FIG. 20, to release the piston 122. The piston 122 permits the upper assembly 116 to drop by its own weight via gravity. When the assembly 116 reaches the lowermost position, the camming pin 212, FIG. 33, comes to rest at the base of the ramp 154, FIG. 32. At this time the fingers are all fully engaged in the corresponding foldline channels of the sheet 14'.

No compressive load is on the sheet 14' in the regions between the fingers or at the fingers because the spacing between the fingers, FIG. 25, is set to correspond exactly to the thickness of the sheet 14'. Thus no compressive deformation of the sheet 14' occurs at any location between the folds during the folding process.

At this time the controller 106 starts the operation of the crank motor 206, FIG. 28. The crank links 202 are displaced so that the levers 192, 194 rotate toward one another to the position of FIG. 28 from the position of FIG. 24. As the levers rotate, the pins 208 FIGS. 22–28 also rotate. Because the pins 208 are different radial distances from the levers 192, 194 pivots 198, each pin will rotate a different angular extent about the pivot 198.

Each pleat member extension being engaged with a different pin is translated in directions 144 by that corresponding pin toward the center of the assemblies 116 and 117. The members at the opposing sets move in opposing relation simultaneously toward one another. At the same time, the camming pins 210 ramps along the corresponding ramps 154 due to the weight of the upper assembly 116. This ramping action displaces the upper assembly vertically toward the lower assembly 117 until the fingers reach their interdigitated position of FIG. 27.

This interdigitated movement folds the sheet 14' at the foldline channels 75 and 100 to produce the corrugations of FIG. 7. This folding action occurs with no compressive loading on the sheet outside the foldline channels 75 and 100. The spacing is such between the upper and lower assemblies during the folding action such that no contact is made on the sheet 14' in the regions between the foldline channels. This precludes damaging the previously formed vortex generators and the sheet 14' in this region.

Since the compressive loading only occurs at the previously deformed foldline channels 75 and 100, the porosity of the remaining portions of the sheet 14' remains without deleterious deformation.

The apparatus may be provided with different finger pleat forming members in the upper and lower assemblies 116 and 117 to accommodate different size sheets 14'.

It will occur to one of ordinary skill that various modifications may be made to the disclosed embodiments without departing from the scope of the invention as defined in the appended claims. For example, while one set of pins and one set of levers are provided, with a set of pins on each lever, two levers may be provided for each of the lower and upper pleat forming sets. Each lever may be provided with pins for engaging only the pleat forming members of that set. A camming pin may be provided the upper assembly lever for engaging a ramp in the lower assembly.

Also, completely automatic operation may be provided if desired with automatic feed of the sheet material to the different apparatuses of FIGS. 10 and 20. The number of creases or foldline channels in the sheet material, the thickness and other parameters including foldline channel depths and spacings as well as the shapes and angles of the pleat folds are according to a given implementation. The number of fingers is given by way of example. More or fewer fingers may be provided as desired. Also, it does not matter whether the upper or lower assemblies have a fixed central finger.

There thus has been described an apparatus for forming foldline channels and vortex generators in a porous sintered high void to surface volume sheet material and an apparatus for forming undulations or pleats in the material with no deleterious deformation of the material during the processes. While sheet material is disclosed, it is intended that material other than sheet material may be processed as disclosed as long as that material is bendable.

Also, while triangular folds are disclosed, other shaped corrugations may be provided, such as continuous undulating curves, or rectangular troughs and ridges. In the latter case, two alternating sets of pairs of fingers may cooperate in the lower and in the upper sets of fingers to simultaneously form rectangular channels. The fingers engage adjacent foldlines for displacing the adjacent foldlines the same depth. Such pairs may be adjacent each other in alternating fashion in the upper and lower dies.

Further, while the channels 73 and 100, FIGS. 5 and 12 are illustrated as being formed by compression, for example, by ridges 75 and 96, respectively, FIGS. 11 and 12, these channels may be formed in the alternative by cutting slits in the sheet material. Such slits may be cut by any conventional cutting tool such as a circular cutting disc suitable for cutting metals, e.g., a carbide tipped disc or by any other known metal cutting device. The sheet material may be held in place by a first apparatus similar to the apparatus 20, FIG. 10, without compression by a clamp apparatus during the cutting. The clamp apparatus may have a cavity for non-compressibly holding the sheet material and having slots therein (not shown) in place of the ridges 73 and 98, FIG. 11, for receiving the cutting tool. The depth of the cuts are provided by devices known in the machine tool art. No piercing of the sheet material would be performed by this apparatus.

A second apparatus may be provided similar to the apparatus 20, FIG. 10 wherein no ridges 73 and 98, FIG. 10, are provided. The second apparatus is otherwise the same as apparatus 20 for piercing the sheet material.

What is claimed is:

1. A method of forming a compressible fibrous porous material that permanently distorts in response to a compression load thereon comprising the step of forming a surface feature in the material at a localized region with negligible compression load distortion of the material in the regions of the material adjacent to and externally of the localized region such that the porosity of the material is substantially unchanged in said regions of the material adjacent to said compression load, the step of forming the surface feature including clamping the material in the regions adjacent to the localized regions with said negligible compression load distortion of the material during the formation of said surface feature.

2. The method of claim 1 wherein the step of forming the surface feature comprises forming a foldline channel.

3. The method of claim 1 further including the step of piercing the material at a piercing site adjacent to said localized region.

4. The method of claim 1 wherein the step of forming the surface feature includes forming a plurality of spaced recessed foldline channels each at a localized region and then bending the material at the channels.

5. The method of claim 1 wherein the step of forming the surface feature includes forming a plurality of recessed creased foldline channels in the material with each channel forming a different localized region.

6. The method of claim 5 wherein the material has opposing broad surfaces, further including forming the crease foldline channels linear and parallel to each other and in said opposing surfaces of the material.

7. The method of claim 6 wherein the crease channels in said opposing surfaces each lie in a plane normal to a broad surface of the material, the, channels on said opposing surfaces lying in alternating planes.

8. The method of claim 5 including the step of bending said material about said channels with negligible compression distortion of the material externally said channels.

9. The method of claim 8 wherein said bending is in alternating opposite directions to form an undulating material.

10. The method of claim 5 wherein the material lies in a plane, said method including piercing said material in a given shape and simultaneously bending the shaped pierced material to form tabs extending from said plane.

11. The method of claim 10 wherein the elements are metal fibers and the material comprises voids of at least about 80% of said volume.

12. The method of claim 11 including coating a catalyst on said material.

13. The method of claim 1 wherein the step of forming the surface feature includes compressively distorting the material at said localized region.

14. An apparatus for forming a compressible fibrous porous sheet material that permanently distorts in response to a compression load of a given magnitude comprising:
means for holding the material with negligible compression load distortion of the material; and
means coupled to the means for holding for forming a surface feature in the held sheet material at a localized region while providing negligible compression load distortion in regions of the material adjacent to and externally the localized region such that the porosity of the material is substantially unchanged in said regions of the material adjacent to said compression load;
the means for holding including means for clamping the material in the regions adjacent to the localized regions with said negligible compression load distortion of the material during the formation of said surface feature.

15. The apparatus of claim 14 wherein the means for forming a surface feature comprises means for forming recessed crease foldline channels.

16. The apparatus of claim 15 wherein the means for clamping comprises a first plate with a first broad surface and a second plate with a second broad surface, the means for forming a surface feature including a plurality of ridges extending from the plates, a first portion of the ridges extending from the first plate broad surface and a second portion of the ridges extending from the second plate broad surface toward the first plate, said ridges each for forming a channel in said received material.

17. The apparatus of claim 16 wherein the ridges of the first plate lie in planes that are located intermediate the planes of the ridges of the second plate.

18. The apparatus of claim 14 further including means for piercing the material at a piercing site adjacent to said localized region.

19. The apparatus of claim 14 wherein the means for forming the surface feature includes means for forming a plurality of spaced foldline channels at a corresponding localized region, the apparatus further including means for bending the material at each of the foldline channels with negligible distortion of the material external the channels.

20. The apparatus of claim 19 wherein the means for forming includes means for forming a plurality of channels in the material with each channel at a different localized region.

21. The apparatus of claim 20 including means for bending said material at said channels with negligible compression distortion of the material in regions externally said channels.

22. The apparatus of claim 14 wherein the material lies in a plane, said apparatus including means for piercing said material in a given shape and simultaneously bending the shaped pierced material to form tabs extending from said plane.

23. The apparatus of claim 22 including means coupled to the means for piercing for bending the pierced material at said channels in alternating opposite directions to form said material into an undulating sheet.

24. The apparatus of claim 23 including at least one cutting element coupled to said base for piercing through the received material.

25. The apparatus of claim 24 wherein the element has a plurality of cutting edges for forming a tab in said received material.

26. An apparatus for folding a received foldable material having a plurality of parallel channels in opposing material surfaces into a plurality of parallel undulations, comprising:
  a first and second plurality of movable spaced fingers defining a material receiving region lying in a plane therebetween, each plurality corresponding to a different received surface, each finger corresponding to and for engaging a different channel of the received material;
  means for relatively initially displacing the first and second plurality of fingers toward one another normal to said plane for engagement with the received corresponding channel; and
  means for simultaneously fuither displacing the fingers of each plurality in a first direction parallel to the plane and in a second direction normal to the plane to bend the received material at said creases.

27. The apparatus of claim 26 wherein each said fingers are each connected to a corresponding member, the means for simultaneously displacing including cam means for simultaneously displacing the members in the first and second directions.

28. The apparatus of claim 27 the cam means comprises first and second plates, a plurality of first projections secured to at least the first plate for engaging a corresponding one of said members and for displacing the corresponding members in the first direction and a second projection and mating cam surface coupled to said plates for causing said plates to gradually ramp toward one another in the second direction as the members displace in the first direction.

29. The apparatus of claim 28 the cam means includes lever means for rotation about at least one pivot, said first projections being secured to the lever means in radially spaced relation from said at least one pivot to linearly displace the corresponding members in said first direction in response to rotation of said lever means.

30. The apparatus of claim 29 wherein the lever means includes first and second pivotally secured levers, the first lever including a first portion of said first projections coupled to a corresponding first portion of said fingers and the second lever including a second portion of said first projections coupled to a corresponding second portion of said fingers for simultaneously displacing said first and second portions of said fingers toward each other in a direction parallel to said plane.

31. The apparatus of claim 30 including crank means for simultaneously rotating said first and second levers.

32. The apparatus of claim 26 further including means for forming apertures through said received material.

33. The apparatus of claim 26 including means for forming channels in said received material.

34. The apparatus of claim 33 wherein the means for forming channels includes means for compressively distorting the material at said channels.

35. A method of forming a compressible fibrous porous material that permanently distorts in response to a compression load thereon comprising the step of forming a surface feature in the material at a localized region with negligible compression load distortion of the material in the regions of the material adjacent to and externally of the localized region such that the porosity of the material is substantially unchanged in said regions of the material adjacent to said compression load and piercing the material at a piercing site adjacent to said localized region.

36. An apparatus for forming a compressible fibrous porous sheet material that permanently distorts in response to a compression load of a given magnitude comprising:
  means for holding the material with negligible compression load distortion of the material;
  means coupled to the means for holding for forming a surface feature in the held sheet material at a localized region while providing negligible compression load distortion in regions of the material adjacent to and externally the localized region such that the porosity of the material is substantially unchanged in said regions of the material adjacent to said compression load; and
  means for piercing the material at a piercing site adjacent to said localized region.

* * * * *